United States Patent [19]

Campanella et al.

[11] 3,937,907

[45] Feb. 10, 1976

[54] DIGITAL ECHO SUPPRESSOR

[75] Inventors: Samuel Joseph Campanella, Gaithersburg; Henri George Suyderhoud, Potomac; Michael Onufry, Jr., Gaithersburg, all of Md.

[73] Assignee: Communications Satellite Corporation, Washington, D.C.

[22] Filed: June 13, 1974

[21] Appl. No.: 479,061

[52] U.S. Cl. ............................................. 179/170.6
[51] Int. Cl.[2] ........................................ H04B 3/20
[58] Field of Search............ 179/170.2, 170.6, 170.8

[56] References Cited
UNITED STATES PATENTS

| | | |
|---|---|---|
| 3,562,448 | 2/1971 | May, Jr. ........................... 179/170.6 |
| 3,673,355 | 6/1972 | LaMarche et al. .............. 179/170.6 |
| 3,821,494 | 6/1974 | Besseyre ......................... 179/170.2 |
| 3,823,275 | 7/1974 | Lamarche et al................. 179/170.2 |

Primary Examiner—Kathleen H. Claffy
Assistant Examiner—Randall P. Myers
Attorney, Agent, or Firm—Sughrue,Rothwell,Mion,Zinn&Macpeak

[57] ABSTRACT

A low cost digital echo suppressor having break-in logic for overriding send-line interrupt operation. The send and receive signals are multiplexed and digitized. The digitized received signals are summed over a period of time to determine interrupt operation. The difference over a period of time of the receive and send line signals controls break in logic for overriding the interrupt operation.

9 Claims, 2 Drawing Figures

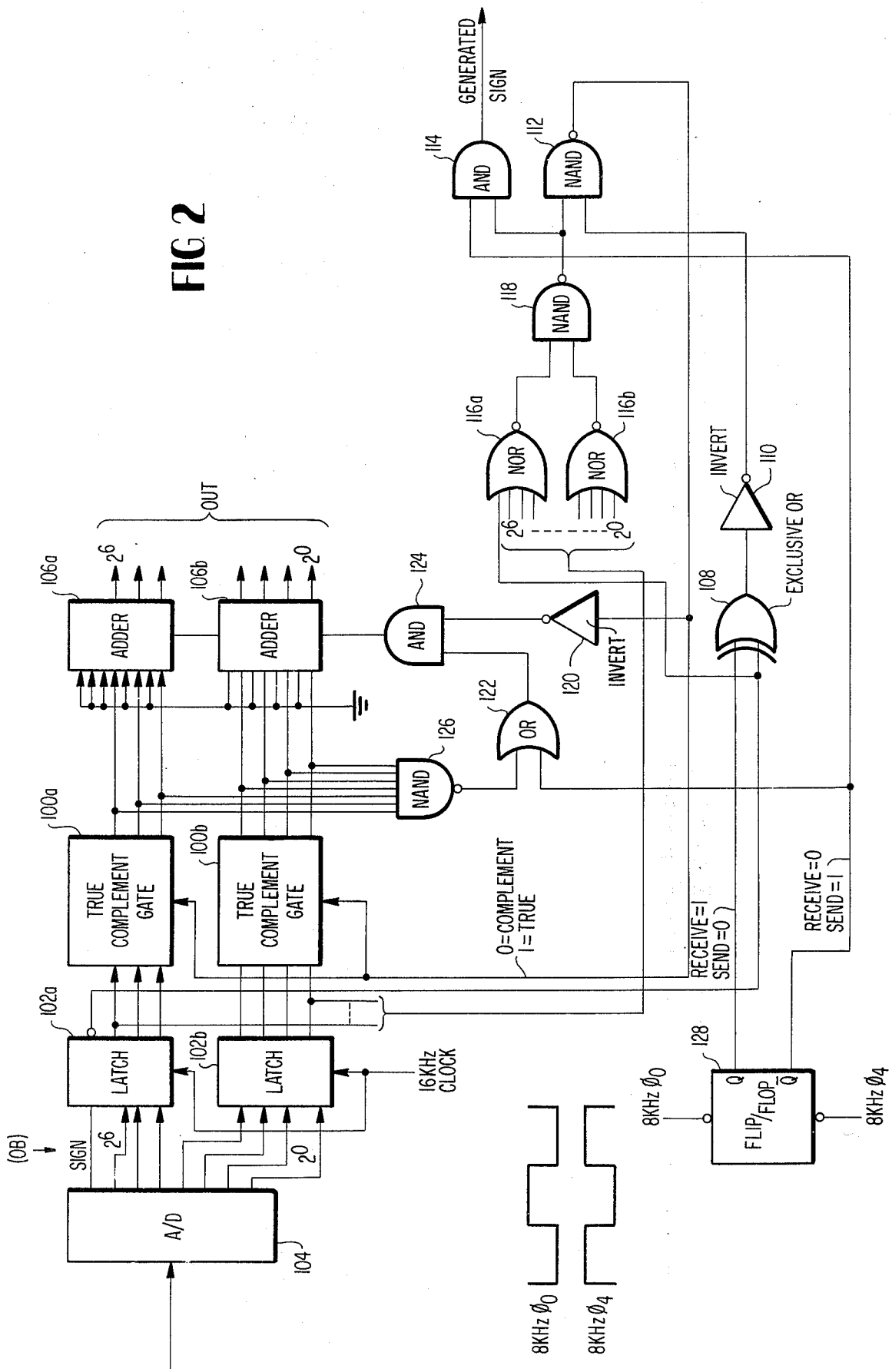

DIGITAL ECHO SUPPRESSOR

BACKGROUND OF THE INVENTION

The invention is in the field of digital echo suppressors. The echo suppressor which is the subject of this invention performs a function presently accomplished by echo suppressors manufactured by numerous telephone communications component production companies. Typical echo suppressors presently available are the Western Electric 3A and 4A, the Cogenel F3 and F4, the Lenkert 931C, the B.P.O. 7A, the Siemens 542024-A45, the WESCOM 622, and numerous other both good and bad. To the knowledge of the inventors, none of the echo suppressors manufactured today incorporates an extensive digital design or a break-in detector and the speech detector of the types incorporated in the present invention.

The present invention will provide an echo suppressor with better long term performance than that exhibited by machines of the present design. This is due to the avoidance of analog threshold adjustments which require frequent maintenance. As a consequence of this, the present invention will operate accurately for long periods of time without the necessity for adjustment. Recent studies conducted by the AT&T Company using an echo suppressor test set which permits on-line testing of echo suppressors have shown more than 50% of the echo suppressors installed are out of tolerance due to the fact that they have drifted in some manner. If these echo suppressors incorporated the concept proposed by the inventors the percent of echo suppressors performing out of tolerance would be significantly reduced.

SUMMARY OF THE INVENTION

The echo suppressor of the present invention operates on digital signals representing the signal on the receive and send lines to determine when interruption of the send line should take place. The send line and receive line signals are multiplexed into a single A/D converter thereby saving on conversion logic. A true/-complement logic system operates on the A/D output signals to cause all receive line signals to be of one sign and all send line signals to be of the opposite sign. If the sum of the receive line signals over a period of time exceeds a threshold value an interrupt switch is thrown in the send line for a given overhang period.

Break-in logic is included to override the interrupt switch under certain conditions. The receive and send line signals from the true/complement logic system are summed over a period of time and the sign of the sum is temporarily stored. When a given number of the signs stored during a predetermined number of successive time periods indicate the send line signals exceed the receive line signals, the break-in operation throws a switch in the send line to bypass the interrupt switch. Also, the break-in logic just described throws an attenuate switch in the receive line to add a 6dB loss to the receive line signals.

BRIEF DESCRIPTION OF THE DRAWINGS

FIG. 2 is a detailed block diagram of one implementation of the logic which forms the control logic and true or complement means of FIG. 1.

DETAILED DESCRIPTION OF THE PREFERRED EMBODIMENT

Figure 1:
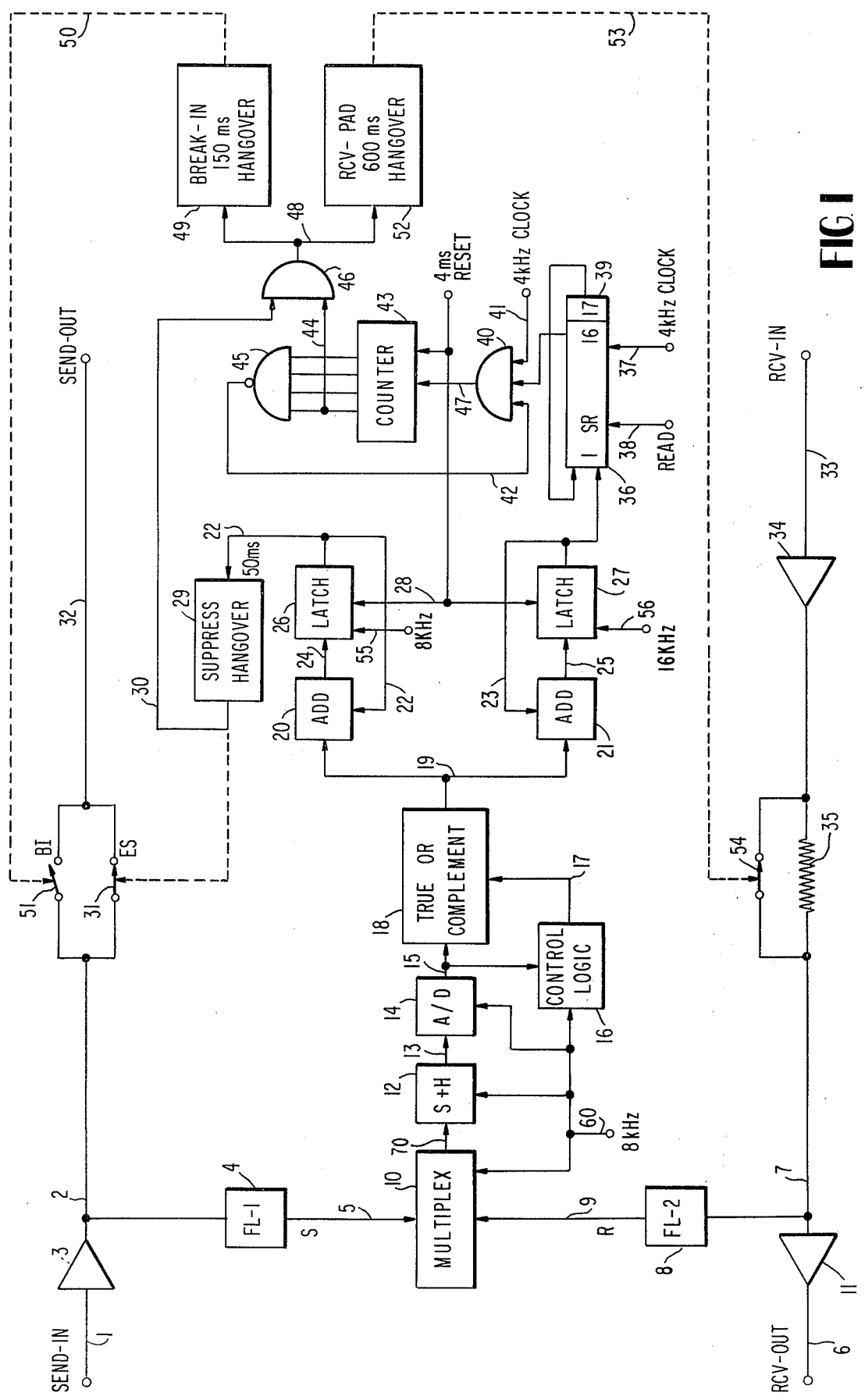
FIG. 1 is a block diagram of a preferred embodiment of the present invention.

The preferred embodiment of the echo suppressor is shown in FIG. 1. The echo suppressor is a 4-terminal device. The terminals to the left of the diagram deliver and accept signals to and from an extension circuit that terminates in the subscriber's set. These circuits, of course, incorporate the traditional hybrid which is the source of the echo problem. The terminals to the right connect to the long distance telephone circuit which may be either terrestrial or satellite. Typically, an echo suppressor is used at both ends of a circuit, but it is not necessary that the identical type of echo suppressor be at both ends.

The echo suppressor functions as follows. Speech signals occurring at the receive-in terminal cause the interruption of the path between the send-in and send-out terminals provided there is no speech at the send-in terminal. This interruption is caused by the activation of normally closed interrupt switch 31 whenever the receive-in speech present has a level exceeding a given threshold. By this means, any echo which is caused by the terminating circuits to the left is stopped by the echo suppressor. It will be seen later that switch 31 will hang-over for 50 milliseconds after the last occurrence of activation. Operation of switch 31, however, constitutes an impediment to the free flow of conversation in both directions since it opens the send path thereby blocking send side speech. To accommodate the free flow of conversation in both directions, it is therefore necessary to provide a means for bypassing switch 31. The act of bypassing is called break-in. It is invoked whenever the speech level at the send-in terminal overrides that at the receive-in terminal in accordance with the specified set of rules which are embodied in the break-in detector circuit. By properly coordinated activation of the receive-side detector and the break-in detector circuits, it is possible to achieve acceptable performance on circuits which are in proper balance and possess long propagation delay.

As an example, it may be assumed that a signal is present on the receive-in line 33, and that no signal is present on send-in line 1. The signal on line 33 is amplified to an appropriate level for echo suppressor operation by amplifier 34. The gain of amplifier 34 can be adjusted to accommodate the design levels of many different systems. The signal next passes through the parallel combination of a 6bB loss pad 35 and normally closed attenuation switch 54. It is sufficient at this time to note that for the condition being discussed, switch 54 bypasses the loss pad. The resulting signal appears on line 7 and is transferred to the receive output line 6 by way of amplifier 11. Amplifier 11 provides flexibility for adjusting to a wide variety of output levels, and it also provides a block against any signal feeding back into the echo suppressor. The signal on line 7 is also supplied to a filter 8 which selects the appropriate frequency range, as specified by CCITT Recommendation G.161, for accomplishing the detection process. The output of the filter appears on line 9 and is supplied as one input to multiplexer 10. The other input to multiplexer 10 is derived from the send-in terminal and will be discussed in greater detail later. The multiplexer alternately presents the signals on lines 5 and 9 to line 70. Line 70 supplies the alternated signal to sample-and-hold 12. The sample-and-hold outputs appear on line 13 and are converted to digital form by analog-todigital converter 14. The analog-to-digital converter converts each sample held by 12. The output of the analog-to-digital converter which appears on line 15 is the digitized version of the signals that appear on lines 5 and 9 in a parallel coded, time division multiplex form. They are next converted to positive-signed absolute values for signals derived from line 9 and to negative-signed absolute values for signals derived from line 5 by the action of true-or-complement logic 18 associated with signal control logic 16 and line 17. The digital signals derived from lines 9 and 5, respectively, alternate in their occurrence due to the action of the multiplexer. Control logic 16 is supplied sign, magnitude and timing information and indicates on line 17 the appropriate control needed to instruct logic 18 to generate either positive-signed absolute or negative-signed absolute values as appropriate.

The elements 10, 12, 14, 16 and 18, taken in combination perform the following operations. The receive side and send side signals are alternated and digitized. All digitized receive side signals are given a positive sign whereas all digitized send side signals are given a negative sign. For example, an input from the send side corresponding to a postitive or negative value of magnitude |Y| will appear at the output of block 18 as a  |Y| . The signal from the receive side corresponding to positive or negative magnitude |X| will appear at the output of block 18 as a + X .

The multiplexer 10 may be any conventional multiplexer of the type which can receive analog inputs and provide a single analog multiplexed output. In the specific example, the multiplexer is operated at a 16 KHz rate by a timing signal on lead 60. The timing signal may be, and in the example described is assumed to be, an 8 KHz square wave. One phase of the square wave (e.g., the positive phase) causes multiplexer 10 to connect the receive side signal on line 9 to the output line 70; the other phase of the square wave causes multiplexer 10 to connect the send side signal on line 5 to the output line 70. The sample-and-hold circuit 12 and the A/D converter 14 operate conventionally to digitize the analog signals. The latter elements are also clocked at the 16 KHz rate to result in alternate digitized send and receive signals at the A/D output. Although many types of conventional A/D converters would be suitable, the invention includes a binary two's complement A/D converter in one preferred embodiment of the invention. The use of a binary two's complement A/D permits a simpler design for the subsequent circuits.

The A/D output signals are fed to logic system illustrated in FIG. 1 as comprising two blocks, a true or complement circuit 18 and a control logic circuit 16. The logic system is controlled time wise by the clock signals on line 60 to cause every digitized receive signal to have a positive sign and every digitized send signal to have a negative sign. An example will serve to illustrate the operation of the logic system. Assume a sequence of analog signals as shown in column 2 of Table 1 below. In column 1, the R and S letters designate receive side and send side signals, respectively. Column 3 indicates the corresponding outputs of the A/D converter 14, assuming a 4 bit two's complement output - 1 bit for sign and 3 for magnitude. Column 4 indicates the corresponding coded outputs from the logic system, and column 5 indicates the analog values corresponding to the codes in column 4.

Table 1

| (1) | (2) | (3)    | (4)    | (5) |
|-----|-----|--------|--------|-----|
| R   | +5  | (0)101 | (0)101 | +5  |
| S   | +3  | (0)011 | (1)101 | −3  |
| R   | −6  | (1)010 | (0)110 | +6  |
| S   | −4  | (1)100 | (1)100 | −4  |

Referring to the table and considering the example of a two's complement A/D converter, the operation of the logic system is as follows. During the positive phase of the 8 KHz square wave control signal, when the output of A/D 14 is a digitized receive side signal, the control logic circuit 16 detects the sign of the A/D output. If the sign bit indicates a positive value, the control logic causes the A/D output to pass unchanged through the true or complement circuit 18. If the sign bit indicates a negative value, the control logic causes the true or complement circuit 18 to convert the latter negative value into its positive two's complement form. This is accomplished by complementing the magnitude and adding "1" to the complemented magnitude. During the negative phase of the 8 KHz square wave, the logic system operates in the opposite manner to that just described.

The signals on line 19 are supplied to a digital adder 20. A second input to the adder is derived from line 22 which presents to the adder the most recent number stored in a latch 26. The sum occurs in digital form on line 24 and is supplied to latch 26. The latch is clocked during the positive portion of the 8 KHz pulse waveform appearing on line 55. Thus, even though all digital signals on line 19 appear at the adder input, only the sums of the latched number and the receive side signals will be entered into latch 26. By the combined action of adder and latch the sum of the absolute values of the signal sampled from line 9 is accumulated in the latch. Once every 4 milliseconds, the latch is reset to "0" by the reset pulse appearing on line 28. The 4 millisecond period is selected because it is long enough to permit integration over a sufficient period in latch 27, and is short enough to accurately follow the changes in the amplitude level differences between the receive and send line signals. Periods of other durations, however, would also be suitable.

Activation of the interrupt or suppression switch 31 occurs whenever the bit configuration in latch 26 corresponds to or exceeds a predetermined threshold. This bit configuration could be the change of state of a single bit corresponding to occurrence of a level of −31 dBmO for a sinusoid appearing on the receive-in line 33. This latter function is accomplished by detection circuitry in the suppression hangover device 29. When the latch number equals or exceeds the predetermined threshold the input hangover device is triggered. The output of the hangover device appearing on line 30 changes state causing switch 31 to open and enabling gate 46. The output of the suppression hangover device will remain in the activated state for 50 milliseconds after the most recent occurrence of the trigger condition on line 22.

The signal necessary to accomplish break-in detection appears on line 19. It will be recalled that the signal appearing on this line is the parallel coded two's complement form of the signals present on lines 5 and 9 which are time division multiplexed from one another and which have been signed in such a manner that the signals appearing on line 9 are positive signed absolute values and those on line 5 are negative signed absolute values. Break-in detection is accomplished by the combined operation of adder 21 and latch 27. All of the digital signals appearing on line 19 are summed with the output of latch 27 appearing on line 23 and the resulting sum is supplied via line 25 to latch 27. Latch 27 is clocked by a 16 KHz waveform in line 56. The result is to accumulate in latch 27 the most recent sum which is composed of the positive signed absolute values of the signal appearing on line 9 and the negative signed absolute values of the signal appearing on line 5. This, of course, is the accumulated difference of the signals mentioned. Latch 27 is reset every 4 milliseconds by the signal on line 28 so that the output of the latch at the moment of reset is the accumulation over the last period of 4 milliseconds. The sign of the accumulated value is transferred to shift register 36 under control of the read instruction on line 38. The latch reset and the shift register read instruction are properly timed to insure that the sign bit is read into the shift register just prior to resetting of the latch.

The shift register, by the action of a 4 KHz clock appearing on line 37 and the recirculation appearing on line 39, stores the most recent N determinations of sign derived from the adder 21 - latch 27 combination. In the specific example herein N=16. When N/2 or more of the signs occurring in shift register 36 are negative (i.e., correspond to binary one's) indicating that the average value appearing on line 5 is greater than that appearing on line 9, the break-in condition is enabled by the action of the logic circuits to be now described. The most recently determined signs of the values accumulated in latch 27 are circulated in shift register 36, the output of stage 16 of the shift register is supplied as one input to an AND gate 40. Also a 4 KHz clock is supplied on line 41 to gate 40. The third input to gate 40 is an INHIBIT input which blocks the gate when a binary 0 logic value is applied thereto. Normally, a binary 1 logic value appears at the INHIBIT input. The 4 KHz clock is admitted to counter 43 if the state on stage 16 is a one and is blocked from counter 43 if the state on stage 16 is a zero. In this way, the counter accumulates the total count of minus signs appearing in shift register 36. The counter is reset once every 4 milliseconds. The result of this operation is to count in counter 43 the number of negative signs in the N most recent sign determinations at the output of latch 27. The 4 KHz clock appearing on line 37 to shift register 36 clocks the most recent N determinations of sign to the counter via gate 40 every 4 milliseconds. This count is accumulated at the output and when the bit configuration corresponding to the occurrence of N/2=8 is realized the input to gate 46 on line 44 goes high. If at the same time the input to gate 46 on line 30 is high or a logic 1 value the output of gate 46 on line 48 goes high. This causes activation of the break-in hangover circuit 49 and the receive side pad hangover circuit 52. The output condition appearing on line 50 from the break-in hangover circuit 49 causes break-in switch 51 to close thus bypassing the echo suppression switch 31. The break-in hangover circuit is designed in such a way as to retain its output high for a period of 150 milliseconds since the last occurrence of an input trigger. When the output of the receive side pad hangover circuit goes high it causes attenuation contact 54 to open inserting 6dB pad 35 in the receive side. This hangover circuit is designed to retain the output condition for a time period of 600 milliseconds since the last occurrence of the input condition. The hangover period of hangover circuit 52 is selected to be substantially as long as the time it takes for the send signal to travel to the other end of the circuit and echo back. The attenuator will thus attenuate the echo of the current send signal. The hangover period selected thus depends upon the nature of the circuit, e.g., satellite single hop, satellite double hop, transatlantic cable, etc. The act of enabling gate 46 by the signal on line 30 causes the activation of the break-in condition only when the suppression hangover circuit has been activated. This inhibits the occurrence of break-in when only send side speech is present. The introduction of the 6dB pad on receive side produces the desired increase in overall round trip circuit loss to reduce the effect of echo during the occurrence of break-in. It also serves to reduce the signal level present on line 9 so that the condition of break-in is given an advantage once it occurs. In order to prevent counter 43 from overflowing, i.e., from advancing from a maximum count to a minimum of zero, gate 45 is provided. The latter gate has an output which goes low, thereby inhibiting gate 40, whenever the counter output consists of all binary one's.

A specific example of the logic for implementing the control logic 16 and true or complement means 18 of FIG. 1 is illustrated in FIG. 2. The logic shown was designed for use with an available A/D converter of the offset binary type. The offset binary code is well known and is shown in Table 2 below along with a corresponding analog range ± 10 V and a corresponding table of two's complement binary code. The table appears in the specification sheet for a Datel Systems A/D Converter which was used in the specific implementation. For simplification, the logic of FIG. 2 is assumed to operate on an eight bit offset binary output (seven bits magnitude and one bit sign). However, the implementation would be the same for a 12 bit offset binary output from the A/D except that each of the elements shown as having parts *a* and *b* would also have a third identical part *c*. For example latch 102, comprising four bit latches 102a and 102b for the eight bit example, would simply include an additional four bit latch 102c (not shown) for the 12 bit implementation.

Table 2

| Analog Output Range (±10V, FS) | Offset Binary | Two's Complement |
|---|---|---|
| +9.995 | 111111111111 | 011111111111 |
| +8.750 | 111100000000 | 011100000000 |
| +7.500 | 111000000000 | 011000000000 |
| +5.000 | 110000000000 | 010000000000 |
| 0.000 | 100000000000 | 000000000000 |
| −5.000 | 010000000000 | 110000000000 |
| −7.500 | 001000000000 | 101000000000 |
| −8.750 | 000100000000 | 100100000000 |
| −9.995 | 000000000001 | 100000000001 |
| −10.000 | 000000000000 | 100000000000 |

The eight bit output from A/D 104 is applied to latch 102. The latch holds the digital output and inverts the sign bit. Thus, the latch output is in two's complement form. The seven magnitude bits are applied to a true complement gate 100 which either passes the bits unchanged to the output thereof or inverts each bit. The inversion results in complementing of the magnitude. The output of gate 100 is applied to digital adder 106 where either a binary 1 or a binary 0 is added to it. The output of adder 106 represents the magnitude portion of the output appearing at line 19 in FIG. 1. The sign bit for the output appears at the output of an AND gate 114. The output is in two's complement form.

As will be recalled from the earlier description of the mode of operation in FIG. 1, all receive side signals of value $\pm |X|$ are given a value $+|X|$. All send signals of $\pm |Y|$ are given a value $-|Y|$. Also, as pointed out previously, when two's complement codes are used, a negative signed value is changed to a positive signed value by complementing the bits and adding a binary 1. The same process is carried out to change a positive signed value to a negative signed value. Also, in two's complement a 0 sign bit represents positive and a 1 sign bit represents negative.

A flip-flop 128 triggered by the 8 KHz clock waveform will be in synchronism with the multiplexer 10 and sample-and-hold circuit 12. The Q output will be a logic 1 when a receive side signal is being processed and will be a logic 0 when a send side signal is processed. The $\overline{Q}$ output is applied as one input to AND gate 114 whose output is the output sign bit. For the present it may be assumed that the other input to AND gate 114 is always a logic 1 thus the $\overline{Q}$ output passes directly to the output of AND gate 114. Whenever a receive signal is processed, $\overline{Q}$ is a logic 0 and thus the AND output indicates a positive sign in two's complement code. During processing of a send signal, $\overline{Q}$ is a logic 1 and thus the AND output indicates a negative sign in two's complement code.

The Q output in combination with the sign output from latch 100 controls the complementing operation. The latter outputs are applied to an exclusive OR 108. The output of 108 is applied to invert gate 110 whose output is applied to NAND 112. The other input to NAND may, for the present, be assumed to always be a logic 1 so that NAND 112 operates as an invert gate. The NAND gate 112 output is connected to the control input of gate 100. The latter gate will pass the input bits to the output in true form when the control is a logic 1 and will invert the input bits when the control is a logic 0. The NAND output is also applied via invert gate 120 and AND gate 124 to the add 1 bit input of adder 106. When a 0 is applied to adder 106 nothing is added to the input magnitude. When a logic 1 is applied a binary 1 is added to the input magnitude. The other input to AND gate 124 is normally a logic 1. It can be seen that under normal conditions a logic 0 output from NAND 112 causes inversion in gate 100 and add 1 in adder 106 - the operation required to change from a value of a first sign to the same value of a second sign. A logic 1 output from NAND 112 normally causes the magnitude bits out of latch 102 to appear unchanged at the output of 106.

The above-described logic will now be considered in connection with four examples of input signals to the logic circuit. Two special exceptions which utilize the additional logic not yet described, will be described later. For the first example, assume a receive signal of $+|X|$. The logic must operate to provide a $+|X|$ at the output. The sign bit from A/D converter 104 will be a logic 1 and this will be changed to a logic 0 in latch 102. $\overline{Q}$ will be a logic 0 so the output sign bit at AND 114 will be a logic 0, indicating a positive sign. Q will be a logic 1 and the sign bit from latch 102 will be a logic 0. Thus, the output of gate 108 will be a logic 1 causing the output of NAND 112 to be a logic 1. Thus, no inversion and no 1-bit addition occur.

In the case where the receive signal is $-|X|$, the sign output from latch 102 will be a logic 1. Thus, the output of NAND 112 will be a logic 0 thereby causing inversion and 1-bit addition to the magnitude bits. The sign bit at the output will be a logic 0. Thus, the output will correspond to $+|X|$ in two's complement.

A send signal of $-|Y|$ passes through unchanged. The sign output is logic 1 because $\overline{Q}$ is a logic 1. The two inputs to exclusive or gate 108 will be 1 and 0 thus causing the NAND 112 output to be a logic 1. In the case of a send signal of $+|Y|$ it will be changed to the two's complement code for $-|Y|$. The minus sign is provided by Q and gate 114. The inputs to gate 108 will both be logic 0 causing the output of NAND 112 to be logic 0.

Two special cases are required because of the nature of the digital codes. Referring to Table 2 it can be seen that there is no code for $-|0|$. All zero magnitudes are encoded as $+|0|$. If a two's complement output of all 0's for a send signal were treated in the normal fashion, i.e., change sign, invert bits and add 1, the resulting code would be 10000 . . . , which corresponds to $-10$ analog output rather than $-0$ value. This special case is taken care of as follows. Assume an all zero output from latch 102 during the send phase of the 8 KHz clock. $\overline{Q}$ is a logic 1. However, the logic 1 will not pass through AND 114 at this time because the all zero condition of the magnitude bits out of latch 102 causes NAND 118 to have a logic 0 output. The latter output disables AND 114 and insures that NAND 112 will have a logic 1 output. The logic 1 output from NAND 112 prevents the inverting and add-1 operation. Thus, the all zero input, even during the send phase, appears at the output as all zeroes.

The second special condition occurs when the latch output has a 1 bit for the sign, zero bits for the magnitude, and exists during the receive phase. As seen from Table 2 the latter two's complement digital output corresponds to $-|10 \text{ volts}|$. If this digital output is operated on the same as other negative signed signals during the receive phase, it would end up as all zeroes. To provide the proper output, the sign is changed, the magnitude bits are inverted, but nothing is added to the magnitude bits. The operation is therefore similar to normal operation when a negative receive signal occurs except that the add-1 operation is disabled by the action of NAND 126 and OR gate 122. The output of NAND 126 is normally a logic 1 so that AND 124 is normally controlled by the output of NAND 112. However, in the special case described herein, the all zero magnitude bits will be inverted by gate 100 to all 1 bits. The all 1 bit condition causes a logic 0 at the output of NAND 126. The $\overline{Q}$ output is a logic 0 because the system is in the receive phase. Thus, the output of OR gate 122 is a logic 0 causing the output of AND gate 124 to be a logic 0.

The echo suppressor described is suitable for time sharing operation. Most of the elements of the digital echo suppressor can be time shared to form echo suppressors for several circuits. This can easily be understood by considering a simple example of two circuits, each having separate send line and receive line, etc. Each circuit would have individual components corresponding to all elements in FIG. 1, except for the multiplexer 10, S & H 12, A/D 14, control logic 16, true or complement means 18, adder 20, adder 21 and counter 43. These latter elements could easily be time shared by both circuits. The timing pulses would be changed to insure that every line, for example, is sampled at 8 KHz. Also, the timing would control the outputs of ADDERS 20 and 21 so that they are supplied to the proper latch for the given circuits. The same is true for the input and output of the counter 43.

The invention described above is a digital echo suppressor that can be fabricated at lower cost and will possess greater reliability than any of the designs presently available on the market today. The low cost results from the extensive application of digital logic techniques which can be time shared over many channels and from the novel double-talk break-in detector and speech detector circuits which can be implemented with a small number of logic components. The reason for high reliability results from the use of a virtually all-digital logic implementation, which minimizes the use of drift prone analog components. Even though its internal operation is digital, the device is designed for use on analog telephone circuits. It is also directly adaptable to digital PCM circuits.

What is claimed is:

1. An echo suppressor adapted for connection between the receive and send lines of a communications circuit to reduce send line echo, comprising:
   a. first means, connected to receive signals on said receive line and said send line, for producing, at an output thereof, in alternating sequence receive line digital codes representative of a first signed absolute values of said receive line signals and send line digital codes representative of an opposite signed absolute values of said send line signals,
   b. first digital summation means connected to said first means for accumulating the sum of said receive line digital codes over repetitive fixed first periods of time,
   c. suppression hangover means connected to said first digital summation means for providing an interrupt output for a first predetermined hangover time when said sum accumulated by said first digital summation means equals or exceeds a predetermined threshold value,
   d. second digital summation means connected to said first means for accumulating the sum of said receive line and send line digital codes over said repetitive fixed first periods of time,
   e. storage means connected to said second digital summation means for storing indicia representing the signs of the last N sums accumulated by said second digital summation means, and
   f. break-in logic means connected to said storage means and to said suppression hangover means for providing a break-in output for a second predetermined hangover time when M of the indicia stored in said storage means represent said opposite sign and said suppression hangover means is providing said interrupt output, where M is a predetermined positive number less than N.

2. An echo suppressor as claimed in claim 1 wherein said break-in logic means, comprises:
   a. counter means connected to said storage means for accumulating the number of said indicia in said storage means corresponding to said opposite sign,
   b. means connected to said counter means and to said suppression hangover means for providing a first trigger output in response to the coincidence of a count of M or greater in said counter means and an interrupt output from said suppression hangover means, and
   c. break-in generator means connected to said last-mentioned means for generating said break-in output in response to the occurrence of said first trigger output.

3. An echo suppressor as claimed in claim 2 wherein said break-in logic means further comprises an attenuation pad generator circuit connected to said trigger output providing means for generating an attenuation pad triggering signal for a third predetermined hangover time in response to said trigger output.

4. An echo suppressor as claimed in claim 3 wherein said first means comprises:
   a. multiplexer means having first and second inputs and one output for alternately connecting said first and second inputs to said output, said first and second inputs being connected to receive a portion of the signals on said receive and send lines, respectively,
   b. analog-to-digital conversion means connected to output of said multiplexer for providing digital representations of the input signals applied thereto,
   c. true or complement logic means connected to said analog-to-digital converter and having a control input terminal adapted to receive control signals of first and second values for providing at an output thereof the true value of said digital representation in response to application of a control signal of said first value and for providing at said output the complement value of said digital representation in response to application of a control signal of said second value, and
   d. control logic means connected to said analog-to-digital conversion means and to the control input terminal of said true or complement logic means for applying to said control input terminal a control signal of said first value when said digital representation represents a receive side signal of said first sign or a send side signal of said opposite sign and a control signal of said second value when said digital representation represents a receive side signal of said opposite sign or a send side signal of said first sign.

5. An echo suppressor as claimed in claim 1 wherein said first means comprises:
   a. multiplexer means having first and second inputs and one output for alternately connecting said first and second inputs to said output, said first and second inputs being connected to receive a portion of the signals on said receive and send lines, respectively,
   b. analog to digital conversion means connected to output of said multiplexer for providing digital representations of the input signals applied thereto,
   c. true or complement logic means connected to said analog-to-digital converter and having a control input terminal adapted to receive control signals of first and second values for providing at an output thereof the true value of said digital representation in response to application of a control signal of said first value and for providing at said output the complement value of said digital representation in response to application of a control signal of said second value, and
   d. control logic means connected to said analog-to-digital conversion means and to the control input terminal of said true or complement logic means for applying to said control input terminal a control signal of said first value when said digital representation represents a receive side signal of said first sign or a send side signal of said opposite sign and a control signal of said second value when said digital representation represents a receive side signal of said opposite sign or a send side signal of said first sign.

6. An echo suppressor as claimed in claim 5 wherein said first digital summation means comprises:
   a. a first digital adder means, having first and second inputs and an output, for adding the digital signals applied to said first and second inputs and providing the sum thereof at said output, said first input being connected to receive the digital codes at the output from said first means, and
   b. a first digital latch means, having an input connected to the output of said first digital adder means, an output connected to the second input of said first digital adder means, a control terminal, and a reset terminal, for storing the sum at the output of said first digital adder in response to a control signal being applied at said control input, said control signal being applied in coincidence with the appearance of said receive line digital codes at the output of said first means, and said reset terminal receiving a reset input at a rate of said repetitive fixed first period of time for resetting said first digital latch.

7. An echo suppressor as claimed in claim 1 wherein said second digital summation means comprises:
   a. a second digital adder means, having first and second inputs and an output, for adding the digital signals applied to said first and second inputs and providing the sum thereof at said output, said first input being connected to receive the digital codes at the output from said first means,
   b. a second digital latch means, having an input connected to the output of said second digital adder means, an output connected to said second input of said second digital adder means, a reset terminal, and a control terminal, for storing the sum at the output of said second digital adder in response to a control signal at said control input, said control signal being applied in coincidence with each digital code output from said first means, and said reset terminal receiving a reset input at a rate of said repetitive fixed first period of time for resetting said second digital latch.

8. An echo suppressor as claimed in claim 1 wherein said first digital summation means comprises:
   a. a first digital adder means, having first and second inputs and an output, for adding the digital signals applied to said first and second inputs and providing the sum thereof at said output, said first input being connected to receive the digital codes at the output from said first means, and
   b. a first digital latch means, having an input connected to the output of said first digital adder means, an output connected to the second input of said first digital adder means, a control terminal, and a reset terminal, for storing the sum at the output of said first digital adder in response to a control signal being applied at said control input, said control signal being applied in coincidence with the appearance of said receive line digital codes at the output of said first means, and said reset terminal receiving a reset input at a rate of said repetitive fixed first period of time for resetting said first digital latch.

9. An echo suppressor as claimed in claim 8 wherein said second digital summation means comprises:
   a. a second digital adder means, having first and second inputs and an output, for adding the digital signals applied to said first and second inputs and providing the sum thereof at said output, said first input being connected to receive the digital codes at the output from said first means, and
   b. a second digital latch means, being an input connected to the output of said second digital adder means, an output connected to said second input of said second digital adder means, a reset terminal, and a control terminal, for storing the sum at the output of said second digital adder in response to a control signal at said control input, said control signal being applied in coincidence with each digital code output from said first means, and said reset terminal receiving a reset input at a rate of said repetitive fixed first period of time for resetting said second digital latch.

\* \* \* \* \*

UNITED STATES PATENT AND TRADEMARK OFFICE
CERTIFICATE OF CORRECTION

PATENT NO. : 3,937,907

DATED : February 10, 1976

INVENTOR(S) : Samuel Joseph Campanella, Henri George Suyderhoud, and Michael Onufry, Jr.

It is certified that error appears in the above-identified patent and that said Letters Patent are hereby corrected as shown below:

IN THE SPECIFICATION

Column 3, line 26, delete " $|Y|$ second occurrence and insert -- $-|Y|$ line 29, delete "+X" and insert -- $+|X|$ --

Column 8, line 13 - delete "Q" and insert -- $\bar{Q}$ --

Signed and Sealed this

Eighth Day of March 1977

[SEAL]

Attest:

RUTH C. MASON
Attesting Officer

C. MARSHALL DANN
Commissioner of Patents and Trademarks